L. L. FULLER.
CONVERTIBLE AUTOMOBILE TONNEAU.
APPLICATION FILED MAY 19, 1921.
1,416,551. Patented May 16, 1922.
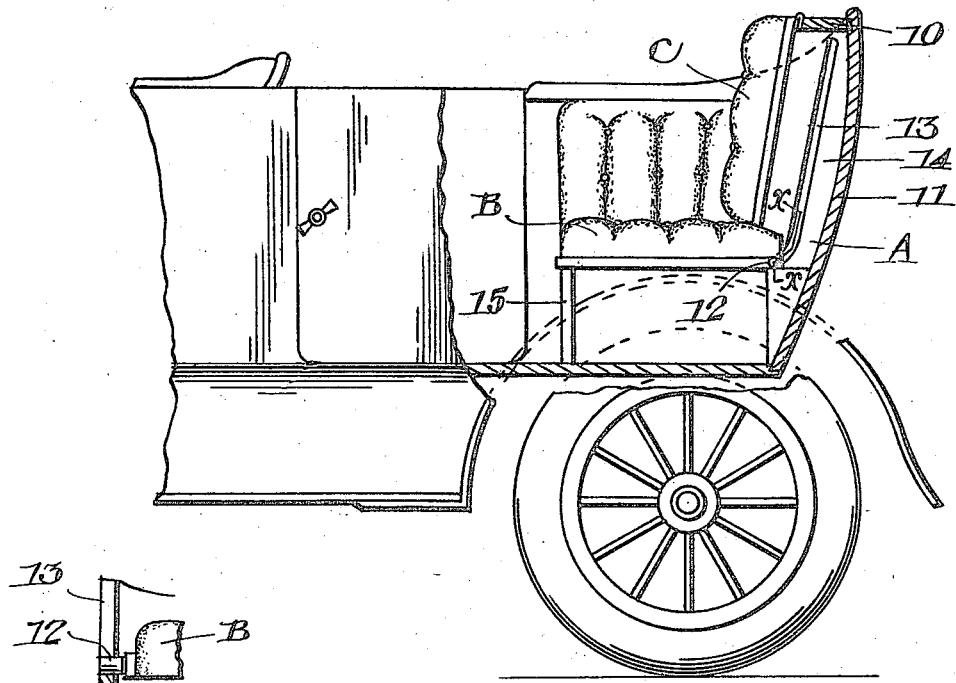
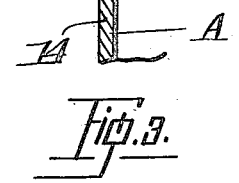
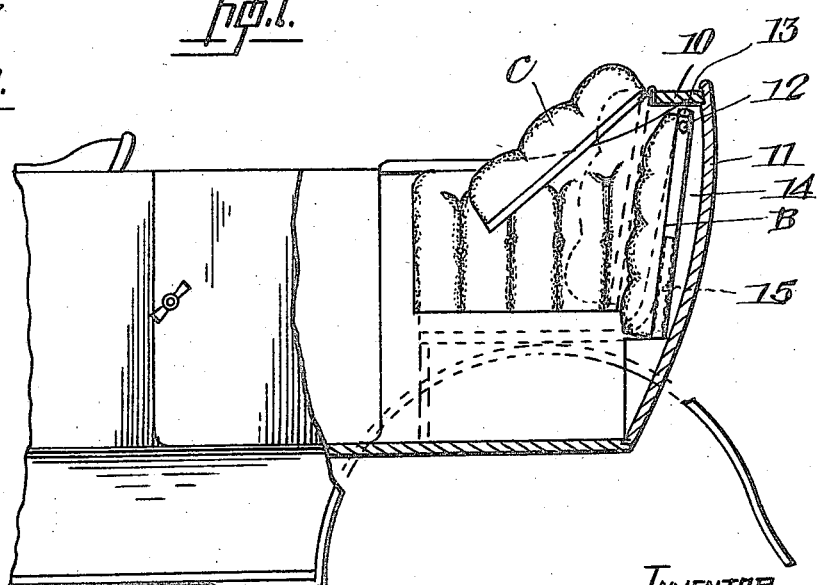
INVENTOR
LESLIE L. FULLER

UNITED STATES PATENT OFFICE.

LESLIE LOCKHART FULLER, OF EDMONTON, ALBERTA, CANADA.

CONVERTIBLE AUTOMOBILE TONNEAU.

1,416,551.  Specification of Letters Patent.  Patented May 16, 1922.

Application filed May 19, 1921. Serial No. 470,823.

*To all whom it may concern:*

Be it known that I, LESLIE LOCKHART FULLER, a subject of the King of Great Britain, and resident of the city of Edmonton, in the Province of Alberta and Dominion of Canada, have invented certain new and useful Improvements in Convertible Automobile Tonneaux, of which the following is a specification.

This invention relates to improvements in convertible automobile tonneaux, and the objects of the invention are to provide a simple and effective device by which the cushions of the seat of a passenger automobile may be moved out of position and stored to adapt the car for the carrying of merchandise or trucking purposes.

Further objects of the invention are to provide such means as will enable the cushions to be stored in exceedingly small space without detachment from the body of the car and such means as will provide a maximum amount of space in the body of the car for the carrying of merchandise.

Further objects still are generally to improve and simplify the construction of the device to better adapt it to perform the functions required of it.

Referring to the drawings:—

Figure 1 is a sectional elevation showing the cushions in position to be used as a passenger car.

Figure 2 is a sectional elevation showing the bottom cushion in stored position and the back cushion swung outwardly to permit movement of the bottom cushion to storage position.

Figure 3 is a sectional detail on the line $x$—$x$, Figure 1.

In the drawings, like characters of reference indicate corresponding parts in all the figures.

Referring to the drawings:—

Figure 4:
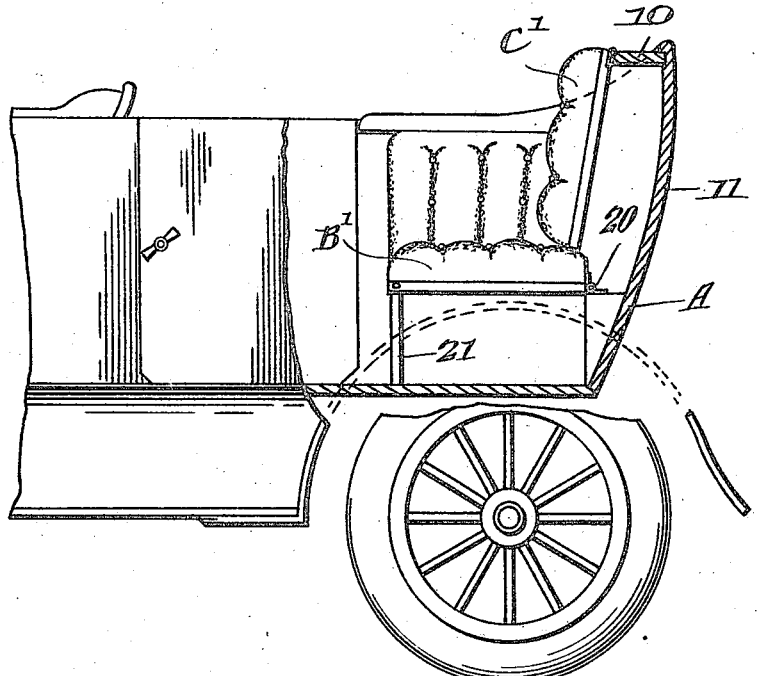
Figure 4 is a sectional elevation of an alternative form of the invention.

A indicates the tonneau of an automobile of any suitable character.

B the bottom cushion of the rear seat, and C the back cushion thereof, these cushions being constructed of suitable material and upholstered in the manner well known in the art.

The cushion C is hinged at its upper face to a projecting rail or plate 10 which projects inwardly from the back 11 of the tonneau, thereby providing a space behind the cushion C in which the bottom cushion B may be stored. The bottom cushion B is supported at its rearmost end by means of side pins 12 which engage in slots 13 in the sides 14 of the tonneau. These slots are positioned between the cushion C and the back 11 and extend in a slightly inclined position from near the top of the tonneau to a position near the normal position of the seat B, the lower end of the slots being slightly curved as indicated in Figure 1, the pin 12 resting on the lower ends of the slot when in normal position. The outer ends of the seat B, when in normal position, are supported by pivot arms 15 which may be swung inwardly and parallel with the bottom of the seat when in storage position.

The normal position of the cushions is as shown in Figure 1 and in this position the tonneau may be used for passenger purposes. When it is desired to carry merchandise in the tonneau, the cushion C is swung outwardly as indicated in Figure 2 and the cushion B is moved into position behind the cushion C, the pins 12 running in the slots 13 until the position indicated in full lines in Figure 2 is reached. At the same time the arms 15 are swung parallel with the bottom of the cushion B and the cushion C is swung back to its normal position, indicated in dotted lines in Figure 2.

It will be seen that the space previously occupied by the cushion B as well as the space beneath it, will be then available for the carrying of merchandise. A car such as this will be found of particular use for farmers and rural dwellers since it can be used both as a pleasure car and also for hauling merchandise and produce.

Figure 5:
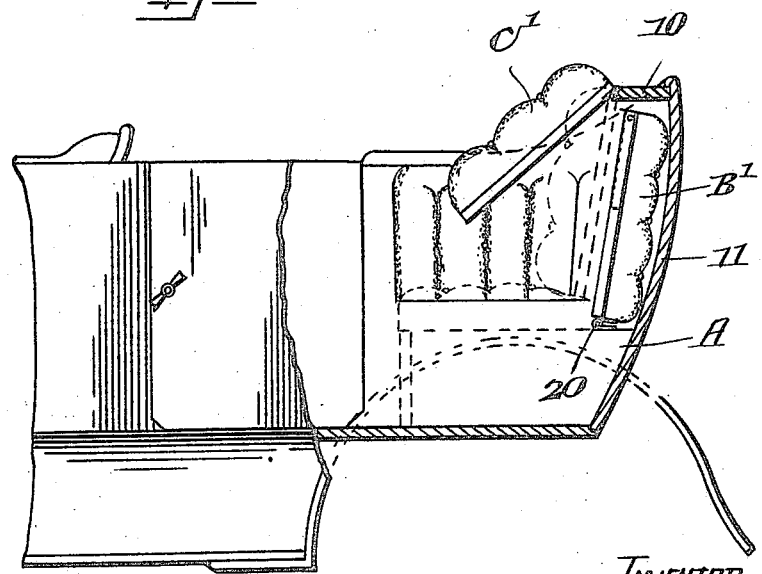
Figure 5 is the same view showing the bottom cushion in storage position.

In the alternative form of the invention shown in Figures 4 and 5, the cushion $C^1$ is mounted in the same way as the cushion C in the other form of the invention. The cushion $B^1$ which corresponds to the cushion B is, however, hinged at its innermost side to the tonneau by means of hinges 20. In this way it may be swung behind the cushion $C^1$ as illustrated. In Figure 5 the cushion $B^1$ is also provided with a hinged leg 21 operating similarly to the hinged leg 15 in the form shown in Figures 1 to 3.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

1. An automobile tonneau comprising a body portion, a back cushion supported from the body portion provided with a space behind it and between the body portion in which a bottom cushion may be stored, a bottom cushion and means for supporting the bottom cushion in such a way that it may be moved without detachment into position behind the back cushion.

2. A device as claimed in claim 1, in which the back cushion is hinged to a projecting rail or pinion.

3. The device as claimed in claim 1 in which the bottom cushion is formed with pins running in slots provided on the pinion.

4. The device as claimed in claim 1 in which the bottom cushion is formed with pivoted supporting arms adapted to support the forward ends thereof.

In witness whereof I have hereunto set my hand in the presence of two witnesses.

LESLIE LOCKHART FULLER.

Witnesses:
    GLADYS G. CUFF,
    JAS. ALLARDICE.